(12) United States Patent
Song et al.

(10) Patent No.: US 7,174,166 B2
(45) Date of Patent: Feb. 6, 2007

(54) HANDOVER METHOD IN NEXT GENERATION MOBILE COMMUNICATION SYSTEM

(75) Inventors: Jae-Su Song, Daejeon (KR); Ju-Hee Kim, Daejeon (KR); Sung-Cheol Chang, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 178 days.

(21) Appl. No.: 10/672,694

(22) Filed: Sep. 25, 2003

(65) Prior Publication Data

US 2004/0121771 A1    Jun. 24, 2004

(30) Foreign Application Priority Data

Dec. 24, 2002    (KR) .................. 10-2002-0083731

(51) Int. Cl.
H04Q 7/20    (2006.01)
(52) U.S. Cl. ....................... 455/436; 455/453
(58) Field of Classification Search ........... 455/436, 455/435, 432.1, 406, 407, 408, 437, 438, 455/439, 456.5, 456.6, 405; 370/331
See application file for complete search history.

(56) References Cited

U.S. PATENT DOCUMENTS 6,577,868 B1 * 6/2003 Vialen et al. ............... 455/441
6,714,784 B1 * 3/2004 Forssell et al. ............. 455/436
6,862,448 B1 * 3/2005 Bims ....................... 455/432.1
2003/0104814 A1 * 6/2003 Gwon et al. ............... 455/436
2004/0068571 A1 * 4/2004 Ahmavaara ................ 709/228
2004/0198383 A1 * 10/2004 Choi ....................... 455/456.1

OTHER PUBLICATIONS

IEEE Transactions on Consumer Electronics, vol. 48, No. 2, May 2002, pp. 335-344.

* cited by examiner

Primary Examiner—Naghmeh Mehrpour
(74) Attorney, Agent, or Firm—Blakely Sokoloff Taylor & Zafman (57) ABSTRACT

Disclosed is a handover method in a next-generation mobile communication system. When a terminal is in the idle state, an IP is reallocated according to a process of mobile IPs to perform a location registration process, and when the terminal is in the active state, it operates according to a procedure of a mobile communication network. Therefore, the terminal operates in two modes to support mobility on the IP-based networks, and it performs a handover procedure by configuring a layer below the MAC to a new AS without allocating the IP at the handover state when it is in the active state to thus minimize handover delay time.

4 Claims, 7 Drawing Sheets

HANDOVER METHOD IN NEXT GENERATION MOBILE COMMUNICATION SYSTEM

CROSS REFERENCE TO RELATED APPLICATION

This application claims priority to and the benefit of Korea Patent Application No. 2002-83731 filed on Dec. 24, 2002 in the Korean Intellectual Property Office, the content of which is incorporated herein by reference.

BACKGROUND OF THE INVENTION (a) Field of the Invention

The present invention relates to a handover method in a next-generation mobile communication system. More specifically, the present invention relates to a handover method applicable to the AII-IP based network, a next-generation mobile communication system.

(b) Description of the Related Art

Rapid developments and diversification in the information technology industry have caused many users to require various services, and hence, next-generation mobile communication systems that fluently provide high-speed mobile multimedia services are also needed. Accordingly, the next-generation mobile communication systems support AII-IP network environments as a default so as to support very high-speed radio packet transmission technologies and have flexibility with links to the existing Internet.

The conventional $3^{rd}$ generation mobile communication system includes circuit-switched networks, and the next-generation mobile communication networks include packet-switched IP (Internet protocol) networks.

Figure 1A:
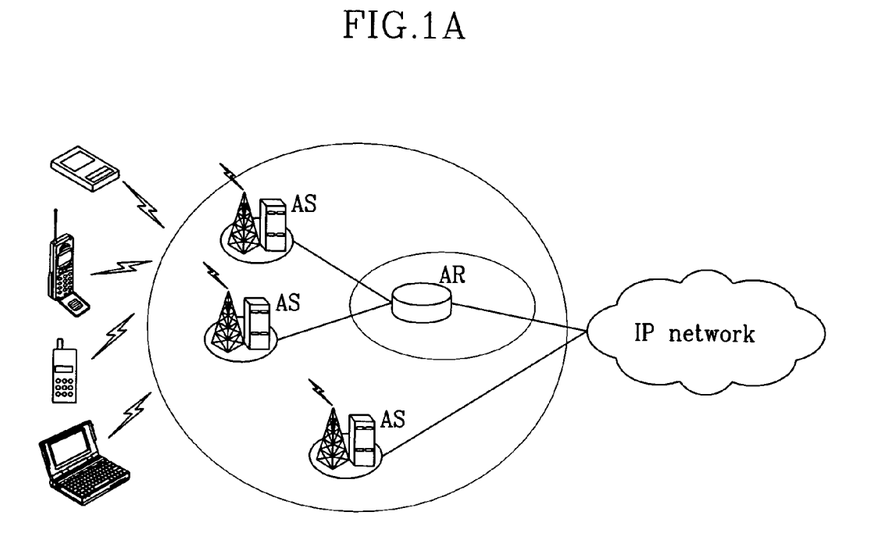
FIGS. 1(a) and 1(b) show a mobile access network in the AII-IP mobile communication network, and a protocol configuration between a terminal and a base station.
Figure 1B:
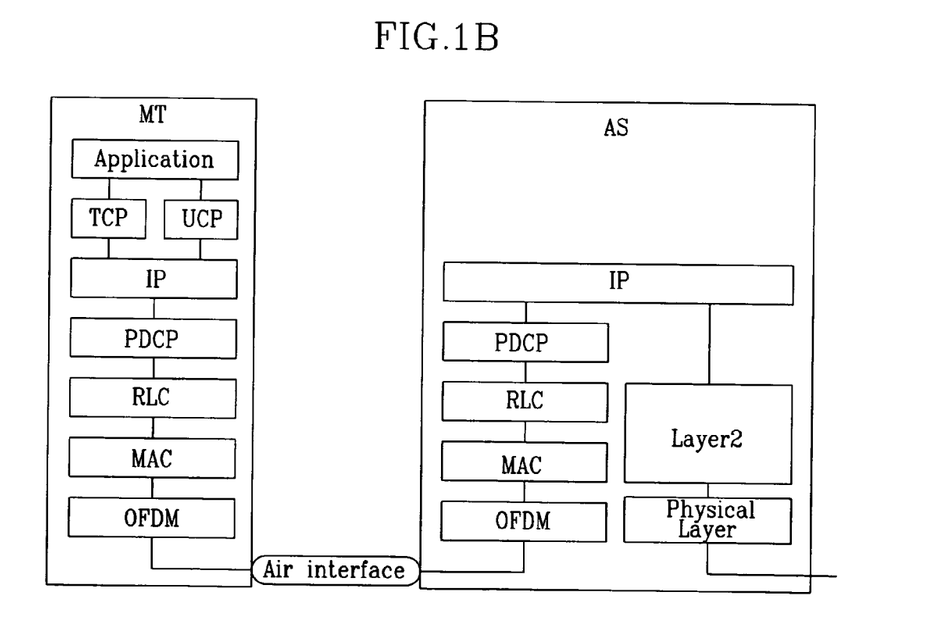

FIG. 1(a) shows a configuration of a RAN (radio access network) in the AII-IP mobile communication network, and FIG. 1(b) shows a protocol configuration between a terminal and a base station.

As shown in FIG. 1(a), the RAN comprises an AS (access station) for functioning as an access point, and an AR (access router). The AS matched with the base station of the conventional mobile communication system executes a control function over an air interface, a radio resource management function, a mobility management function, a call management function, and a packet scheduling function. The AR executes an IP packet routing function and a mobile IP function.

FIG. 1(b) shows a user plane protocol configuration between a base station and a terminal in the next-generation high-speed multimedia mobile communication system. User traffic is on the basis of IP-based data transmission. A user IP is allocated from an AS or an AR having a foreign agent function by a mobile IP. A PDCP performs a header compression function of the IP packets, and an RLC (radio link control) layer performs radio link control functions including data flow control and reliable data transmission. A MAC (media access control) layer performs traffic scheduling and packet multiplexing, and a physical layer has the OFDM technology applied to data transmission in the air interface.

Figure 2:
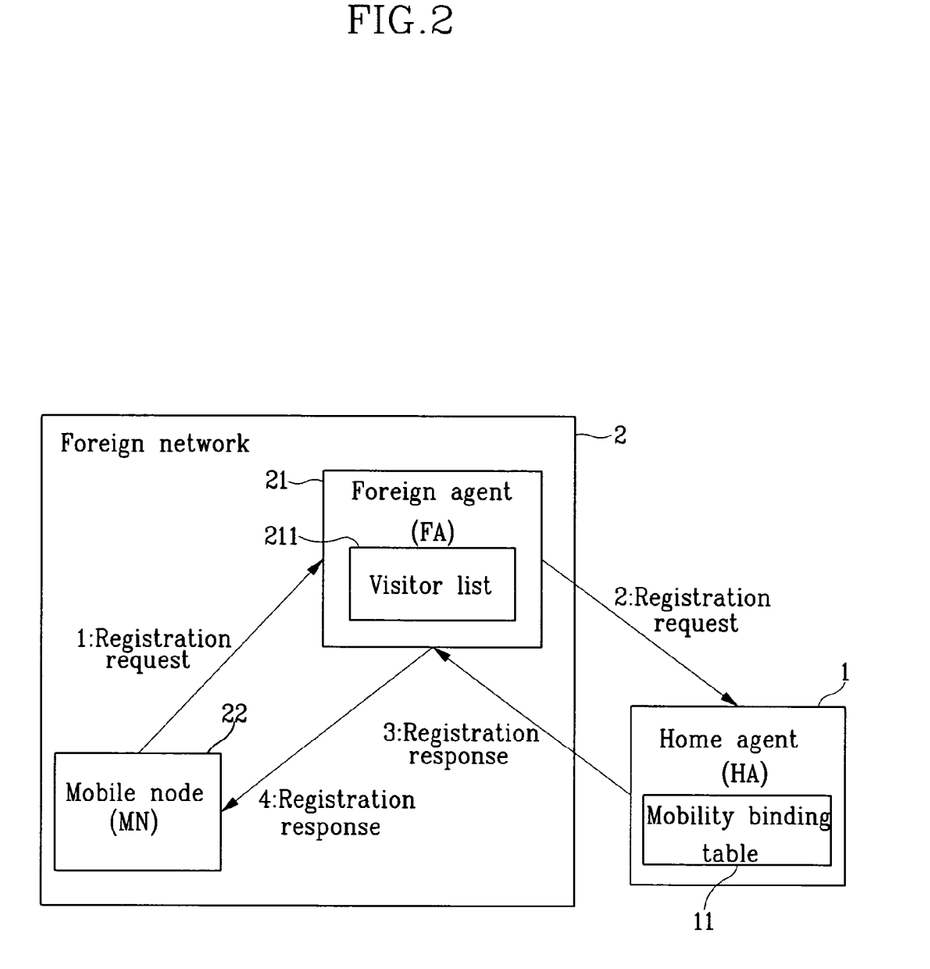
FIG. 2 shows a registration process of a mobile terminal in a mobile IP.
Figure 3:
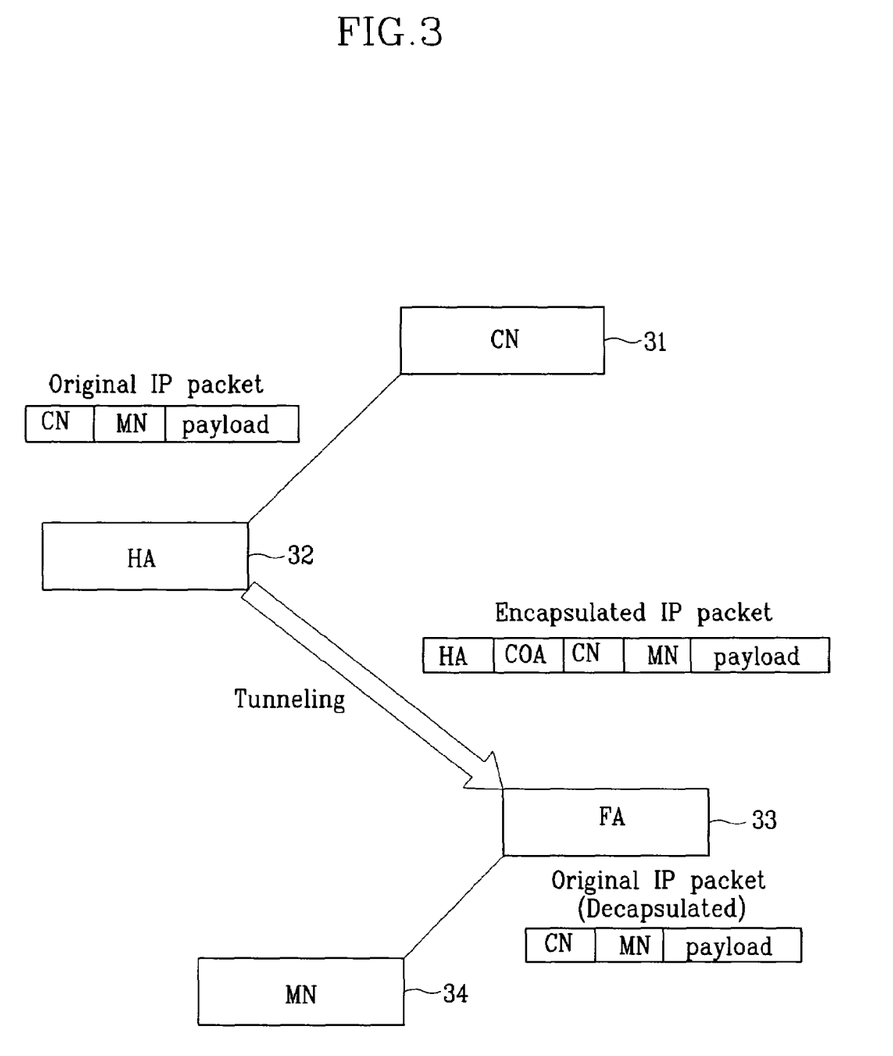
FIG. 3 shows a tunneling process in a mobile IP.

The most important factor in the IP-based mobile communication system is a terminal's mobility. A mobile IP is used to guarantee the mobility of the terminal. The mobile IP allocates a new IP address (i.e., a CoA (care-of-address) hereinafter) for enabling communication in a moved area when the terminal has moved to a new network or cell, and it binds a terminal-specific IP to a CoA for each network, thereby solving the above-noted mobility problem. A basic mobile IP processing procedure is described below, a registration process is shown in FIG. 2, and a tunneling process is shown in FIG. 3. Referring to FIGS. 2 and 3, a mobile IP processing procedure will be described.

1. Agent Discovery

When receiving an agent advertisement message periodically advertised by an MA (mobile agent), a mobile node 22 (also referred to as a mobile terminal) of FIG. 2 analyzes the received message, and performs a registration process when the mobile node belongs to a foreign network 2.

2. Registration

When a terminal sends a registration request message to an FA (foreign agent) 21, the FA 21 sends the registration request message to an HA (home agent) 1 to perform a registration process on the corresponding terminal 22. When the HA 1 updates a home address of the mobile terminal and a mobility binding table 11 of the CoA after an authentication process is finished, and sends an acknowledgment message to the FA 21, the FA 21 updates terminal information and sends a response message to the mobile terminal 22.

3. Service

1) When a CN (correspondent node) 31 sends packets to the home address of the mobile terminal, the HA 32 receives the packets and transmits them to the FAs 21 and 33 through a tunnel.

2) The FAs 21 and 33 use a visitor list 211 to search whether a target terminal of the received packets is provided on the current network, and when it is on the list, they transmit the packets to the corresponding terminal.

3) When the mobile terminal transmits the packets to the CN 31, the mobile terminal initially sends the packets to the FAs 21 and 33, and the FAs 21 and 33 route them according to a normal IP routing method.

As described in the process summary of the mobile IP, in order for a mobile terminal to move to a foreign network to register a location, and receive a CoA, it is required for an HA and an FA to communicate messages between them. Therefore, if the handover frequently generates because the mobile terminal frequently changes access networks, the message exchanges frequently occur, and this occurrence may work as a load on the whole network. Also, each time the handover occurs, it is problematically required to update the routing table and the mobility binding table in relation to the HA and the FA, and a processing delay for reconfiguring the IP layer becomes longer. In addition, in the case of updating an IP connection, a remarkable amount of packets are lost in the break-and-make process. That is, the mobility support method of the mobile IP has 3 problems. First, it takes much time to update information on the HA and the FA and receive a new IP. Second, messages for updating the information may increase loads on the network. Third, data may be lost in the handover process.

SUMMARY OF THE INVENTION

It is an advantage of the present invention to provide a handover method in the next-generation mobile communication system for minimizing the packet loss and reducing the handover processing delay during the handover process, and decreasing network loads caused by a frequent registration process depending on a terminal's location-moving.

In one aspect of the present invention, a handover method for mobility of a terminal in a mobile communication system comprises:

(a) performing IP (Internet protocol) acquisition through an IP registration process according to a mobile IP when a terminal in the idle state moves to a new cell; and (b) transmitting traffic to a new moving AS (access station) from a previous AS without performing an IP modification and registration process when a terminal in the active state moves to a new cell.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

A handover process will be described referring to FIGS. 4 and 5.

Figure 4:
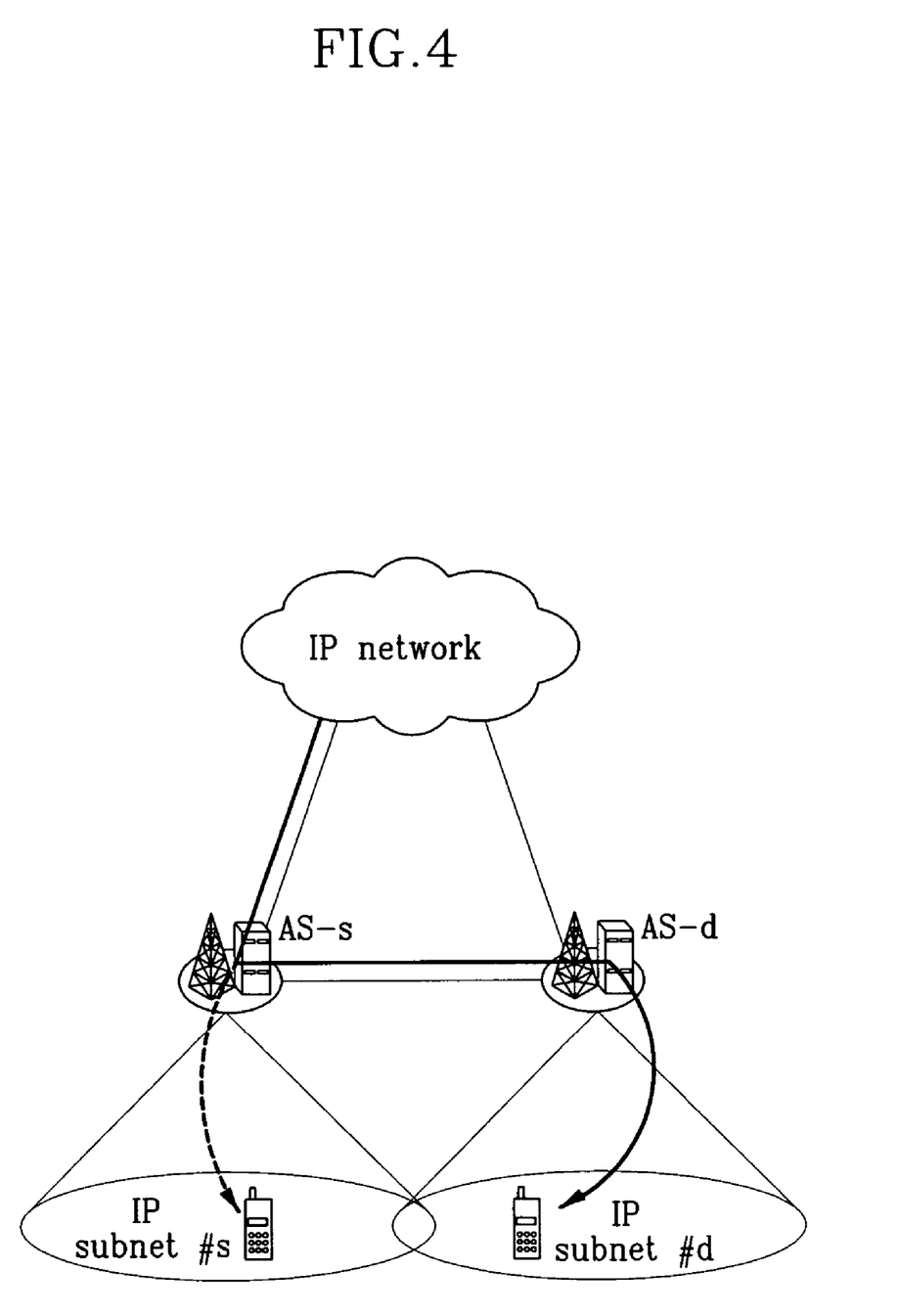
FIG. 4 shows a traffic flow in a handover method according to a preferred embodiment of the present invention.
Figure 5:
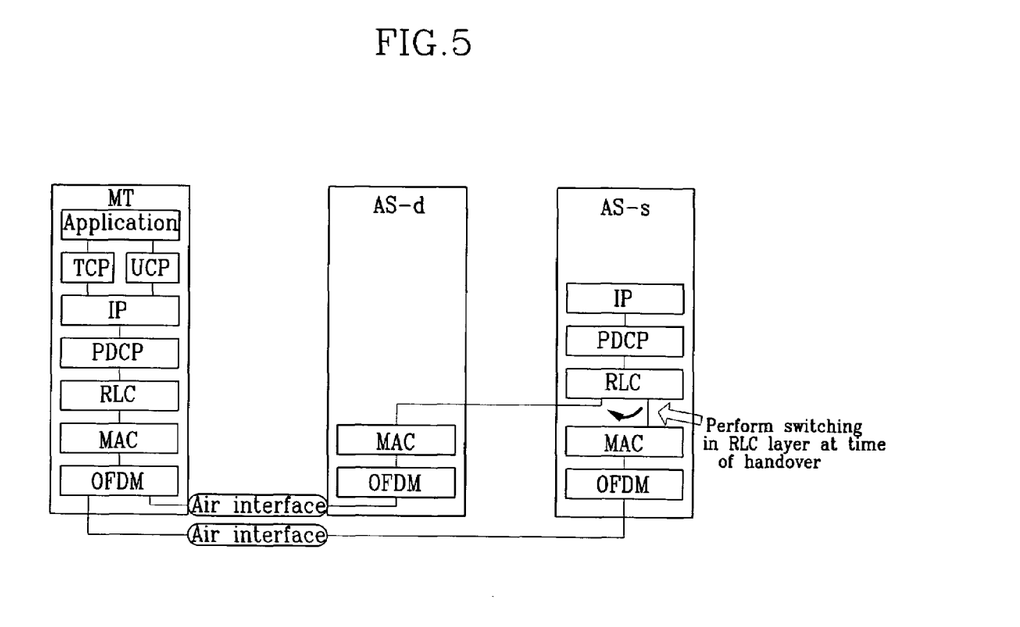
FIG. 5 shows a protocol configuration in the handover method according to a preferred embodiment of the present invention.

FIG. 4 shows a traffic flow in a handover method according to a preferred embodiment of the present invention, and FIG. 5 shows a protocol configuration in the handover method according to a preferred embodiment of the present invention.

The handover process is divided into two processes according to a terminal's state. That is, when the terminal is in the idle state, the terminal operates according to a mobile IP process. When the terminal is active, it does not perform an IP registration process, but sends the traffic, transmitted to an RPL/MAC/physical layer of a serving AS(AS-s) in which the mobile terminal is currently serviced, to a physical layer of an MAC/drift AS(AS-d) of an RLC/drift AS(AS-d) to transmit user packets to a terminal in a drift AS(AS-d) region without undergoing an IP routing process, thereby executing the handover process.

Figure 6:
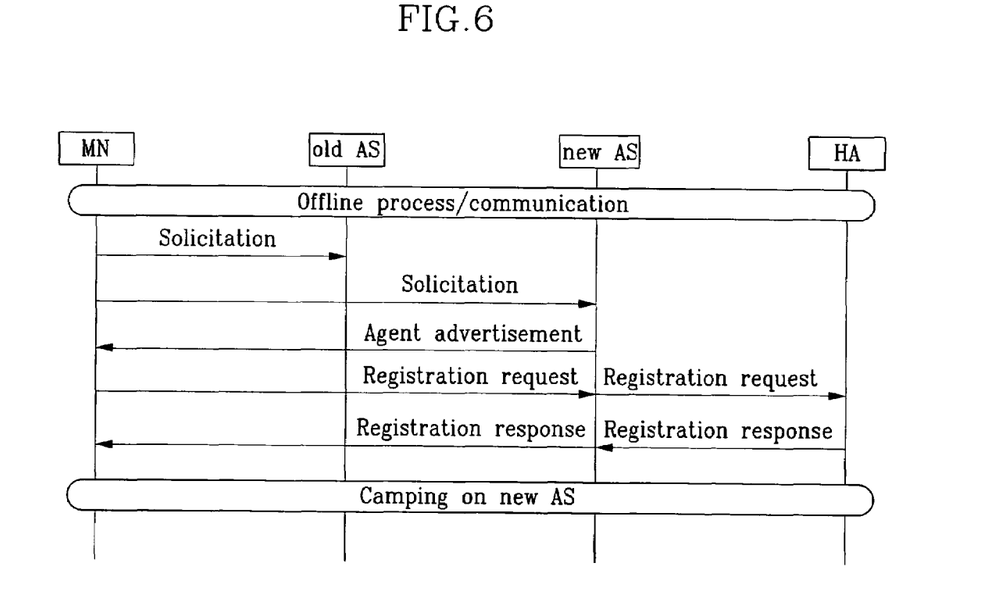
FIG. 6 shows a location registration flow when a terminal is in the idle state.

First, a process for supporting mobility of a terminal in the idle state will be described referring to FIG. 6. When a terminal receives an agent advertisement message broadcast by a new AS, the terminal knows corresponding AS information from the received message, and transmits a registration request message to the corresponding AS to start a CoA acquisition process. The AS sends a registration request message to the HA to perform a registration process on the corresponding terminal. The HA updates a home address of a mobile terminal and a mobility binding table of the CoA after an authentication process, and when the HA sends an acknowledgment message to the AS, the FA updates terminal information, and sends a response message to the terminal, thereby finishing the terminal's CoA acquisition process.

Figure 7:
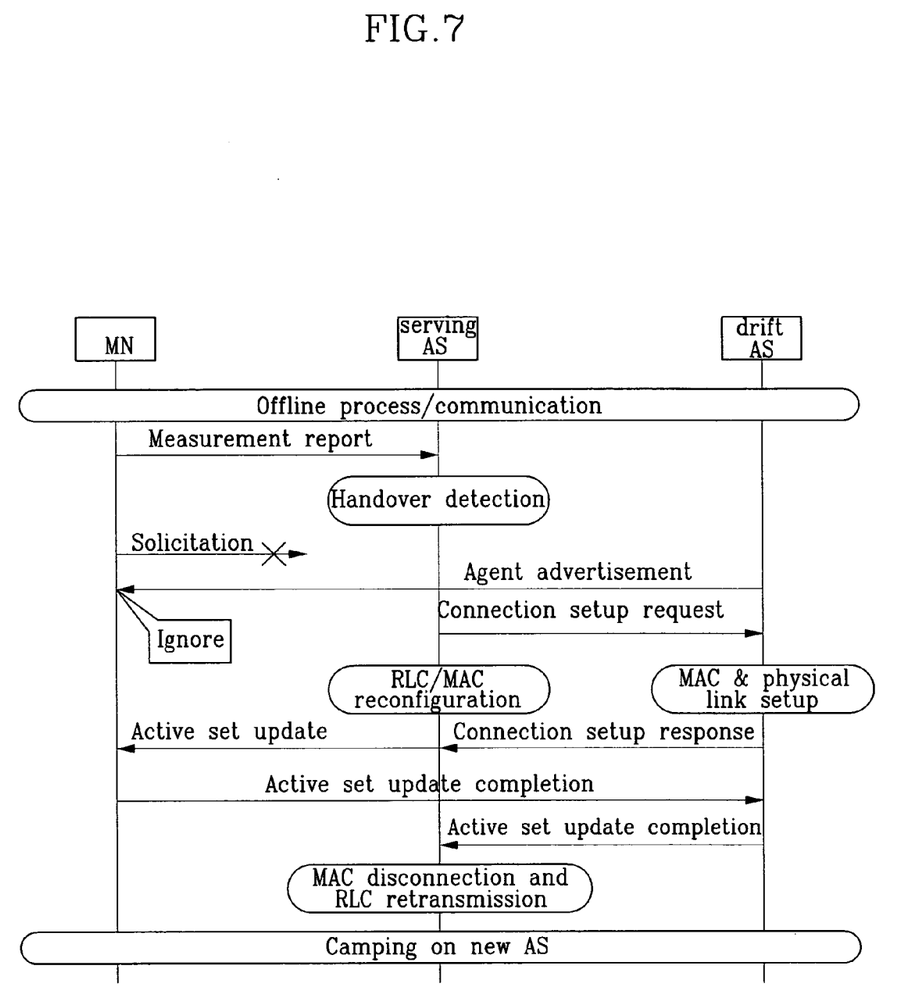
FIGS. 7 and 8 show a message flow in the handover method according to a preferred embodiment of the present invention.
Figure 8:
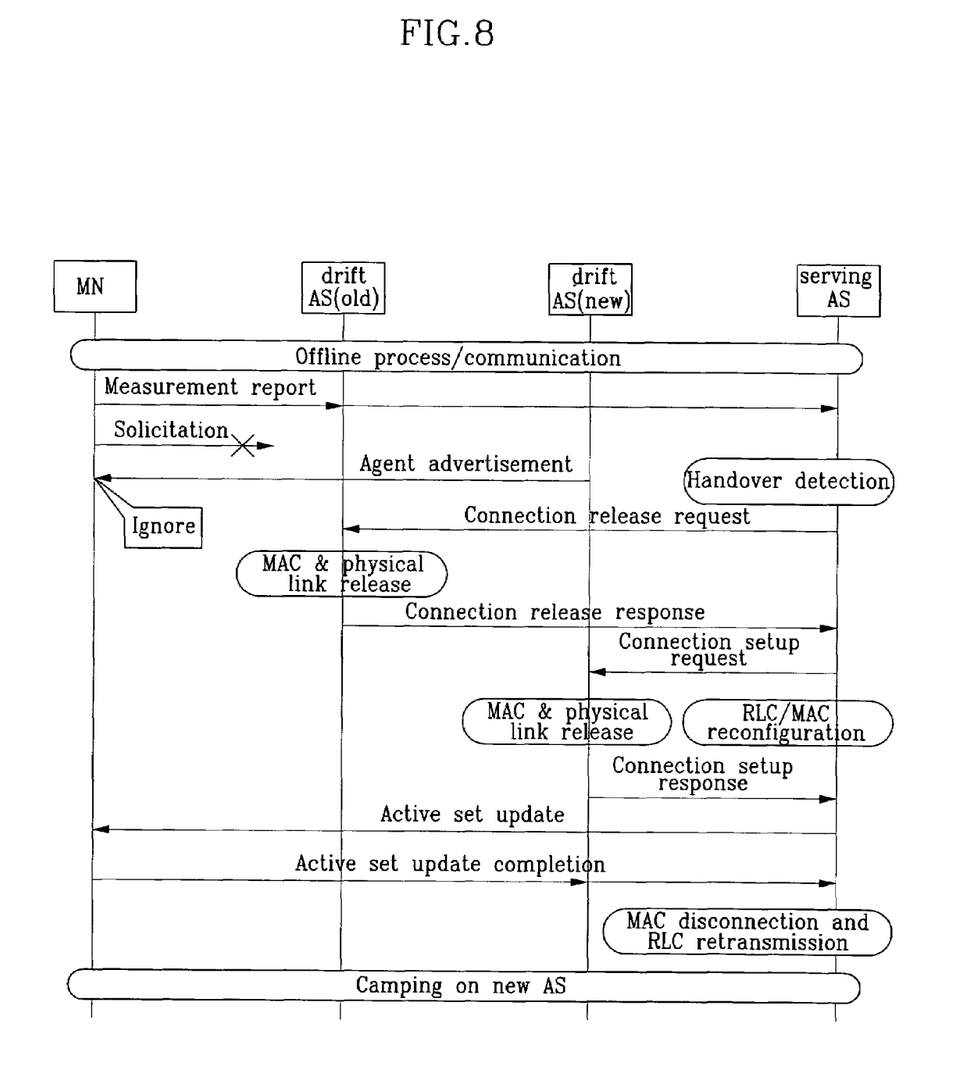

FIGS. 7 and 8 show handover processes of a terminal in the active state. The active terminal does not perform an IP acquisition procedure in the like manner of the idle state. That is, when receiving an agent advertisement message from a drift AS, the active terminal does not perform a registration process, but ignores it. Instead, the active terminal reports a channel state (a measurement report message) to the serving AS through a preset RRC connection to a serving AS that is currently serviced, and the serving AS reads the channel status from the received message to determine whether to perform a handover.

When determining to start the handover process, the serving AS sends a connection setup request message to the corresponding drift AS. The message includes physical layer configuration information for setting a radio link, and MAC configuration information. When receiving the connection setup request message, the drift AS allocates radio resources according to the received configuration information, and establishes MAC objects and radio links so as to support data transmission. When a branch is added through this procedure, the serving AS adds the branch to the RLC object so that the traffic that was transmitted through the MAC object in the serving AS in the RLC layer may be transmitted to the MAC object established to the drift AS.

After the addition of the branch, the serving AS transmits an active set update message to the corresponding terminal. When the process for changing the physical channels is finished at the terminal, the terminal transmits an active set update completion message to the drift AS through the new established physical channel. When receiving the active set update completion message, the drift AS sends an active set update completion message to the serving AS, and on receiving the message, the serving AS starts to switch the layer below the MAC to the drift AS. The RLC object starts to send the traffic data to the MAC object of the drift AS together with the switching, thereby finishing the handover process. In this instance, since the buffer of the RLC object is maintained during the handover processing period, the packets lost during the handover process are retransmitted by the retransmission function of the RLC, thereby enabling lossless data transmission. Also, since the switching is executed in the lower layer of the RLC, the IP packets can be transmitted without receiving a new CoA.

FIG. 8 shows a handover process when a terminal in the active state moves to another AS from the drift AS. In the like manner of the method described referring to FIG. 7, when a handover is determined according to the terminal's channel state measurement report message, the serving AS cancels the branch setting with the (old) preset drift AS, adds a branch to a new drift AS, and establishes radio links with the new drift AS. When this process is finished, the serving AS reconfigures the RLC objects in the serving AS, and sends an active set update message to the terminal so that the terminal may modify the active set. When the active set update process is finished, the serving AS modifies the RLC objects so that the traffic that was transmitted to the MAC object of the (old) drift AC from the RLC in the serving AS may be transmitted to the MAC object of a (new) drift AS, thereby finishing the handover process.

FIG. 5 shows a protocol configuration between a terminal and an AS for traffic transmission on the user plane at the time of handover. In the case of downward traffic transmission, the IP packets transmitted from a correspondent node are sent to the serving AS, and header-compression is performed on them by the PDCP object. The packets sent to the RLC are transmitted to the MAC object of the drift AS through the IP network according to preset information, passed through the MAC/physical layer, and transmitted to the final terminal from the air interface. Since the serving AS does not perform IP routing to the drift AS, and the RLC performs branch switching, data transmission to the terminal using the previous CoA is allowed. The upward traffic is transmitted to the correspondent node through the same path as that of the downward traffic.

Since the current mobile communication networks used as infrastructures for the mobile Internet support dual-layer mobility, global roaming is difficult because of dependence on the infrastructure. Since the mobile IPs contrarily provide triple-layer mobility to provide independent mobility to the infrastructure, it is appropriate for supporting global roaming for the IP-based next-generation networks. However, since the mobile IPs are designed to support slow mobility in a wide area, they have problems in providing real-time services to quick moving terminals. In order to obtain advantages including the mobility of the mobile IPs and fast handover in the mobile communication networks in the preferred embodiment of the present invention, the mobility support procedure in the mobile IP is performed when a mobile terminal is in the idle state, and a handover caused by the handover process used by the mobile communication networks (UMTS) is implemented when it is in the active state. That is, when the terminal is in the idle state, it guarantees mobility on the IP-based network since it follows the procedure of the mobile IPs. Since the handover is performed only with switching below the MAC layer without modifying the IPs in the handover process in the active state, the following effects are expected.

Regarding the network side, the network loads are reduced since no IP registration process is required. As to the mobile terminal side, time delay required for performing the handover is remarkably reduced. Also, data loss can be generated during the switching time to a new link from an existing link in the IP registration process of the mobile IP's handover procedure, and since the data loss is compensated because of the retransmission in the RLC layer in the preferred embodiment of the present invention, data loss can be prevented without addition of new functions. Therefore, the two problems including the time delay in the handover and the data loss are both solved. In addition, since the IP address of the terminal is not modified, the procedure of updating the routing table of each router can be omitted.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A handover method for mobility of a terminal in a mobile communication system, comprising:
    (a) performing IP (Internet protocol) acquisition through an IP registration process according to a mobile IP when a terminal in an idle state moves to a new cell; and
    (b) transmitting traffic to a new moving AS (access station) from a previous AS without performing an IP modification and registration process when the mobile terminal in an active state moves to a new cell,
    the step (b) comprising:
    receiving a channel state measurement report message from the mobile terminal;
    a control AS determining a handover to set a radio link at a drift AS, and reconfigure an RLC (radio link control) layer at a serving AS;
    transmitting an active set update message to the mobile terminal; and starting traffic access to the drift AS.

2. The method of claim 1, wherein when the terminal is in the active state in (b), data traffic transmitted through a radio link following an IP/RLC/MAC/physical layer preset in a serving AS is switched to a MAC/physical layer of a drift AS through the drift AS.

3. The method of claim 2, wherein when the terminal is in the active state, data lost while generating the link moving to the terminal from the serving AS through the drift AS at a time of generation of handover are retransmitted using a retransmission function in the RIG layer when the handover is finished.

4. The method of claim 1, wherein the terminal operates according to a procedure of the mobile IP when the terminal is in the idle state, and it operates according to a mobile communication network procedure when it is in the active state.

* * * * *